US012684383B2

(12) United States Patent
Shi

(10) Patent No.: US 12,684,383 B2
(45) Date of Patent: Jul. 14, 2026

(54) RELAXATION MEASUREMENT PROCESSING METHOD AND APPARATUS, AND READABLE STORAGE MEDIUM

(71) Applicant: Beijing Xiaomi Mobile Software Co., Ltd., Beijing (CN)

(72) Inventor: Rao Shi, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 312 days.

(21) Appl. No.: 18/560,238

(22) PCT Filed: May 14, 2021

(86) PCT No.: PCT/CN2021/093840
§ 371 (c)(1),
(2) Date: Nov. 10, 2023

(87) PCT Pub. No.: WO2022/236812
PCT Pub. Date: Nov. 17, 2022

(65) Prior Publication Data
US 2024/0365143 A1 Oct. 31, 2024

(51) Int. Cl.
*H04W 24/08* (2009.01)
*H04W 48/20* (2009.01)

(52) U.S. Cl.
CPC ........... *H04W 24/08* (2013.01); *H04W 48/20* (2013.01)

(58) Field of Classification Search
CPC ..... H04W 36/00; H04W 24/08; H04W 24/10; H04W 48/20; Y02D 30/70
See application file for complete search history.

(56) References Cited

U.S. PATENT DOCUMENTS

| | | | |
|---|---|---|---|
| 2021/0076275 A1 | 3/2021 | Yiu et al. | |
| 2022/0353763 A1* | 11/2022 | Li | H04W 24/02 |
| 2022/0417781 A1* | 12/2022 | Xie | H04W 72/02 |
| 2023/0078923 A1* | 3/2023 | Shi | H04W 52/0258 |
| | | | 370/311 |

(Continued)

FOREIGN PATENT DOCUMENTS

| | | |
|---|---|---|
| CN | 108029035 A | 5/2018 |
| CN | 109309938 A | 2/2019 |

(Continued)

OTHER PUBLICATIONS

"Draft_R4-2017141_Draft CR on FR1 Inter Frequency Cell reselection Tests for UE configured with relaxed measurement criterion", 3GPP TSG-RAN WG4 Meeting # 97-e, R4-2017141, Nov. 2-13, 2020.

*Primary Examiner* — Congvan Tran
(74) *Attorney, Agent, or Firm* — Volpe Koenig

(57) ABSTRACT

A relaxation measurement processing method includes: sending first indication information to a user equipment (UE), the first indication information is used to indicate whether the UE is allowed to use a static attribute, the static attribute indicates that a static criterion is satisfied, and the relaxation degree of a relaxation measurement scheme corresponding to the static criterion is greater than the relaxation degree of a relaxation measurement scheme corresponding to a low mobility criterion, and is greater than the relaxation degree of a relaxation measurement scheme corresponding to a non-cell edge criterion.

20 Claims, 3 Drawing Sheets

Network device

UE

S201: Send first indication information to the UE, the first indication information being used to indicate whether the UE is allowed to use a static attribute, where the static attribute indicates that a static criterion is satisfied, and the relaxation degree of a relaxation measurement scheme corresponding to the static criterion is greater than the relaxation degree of a relaxation measurement scheme corresponding to a low mobility criterion and is greater than the relaxation degree of relaxation measurement scheme corresponding to a non-cell edge criterion

(56)                    References Cited

U.S. PATENT DOCUMENTS

| 2023/0269614 A1* | 8/2023 | Chen .................... H04W 24/08 |
| | | 370/252 |
| 2024/0057199 A1* | 2/2024 | Tsuboi ................. H04W 76/25 |
| 2024/0080772 A1* | 3/2024 | Laselva ............. H04W 52/0229 |
| 2024/0114372 A1* | 4/2024 | Xu .................... H04W 36/0085 |
| 2024/0196333 A1* | 6/2024 | Hu ................... H04W 52/0238 |

FOREIGN PATENT DOCUMENTS

| CN | 111787567 A | 10/2020 |
| CN | 111800800 A | 10/2020 |
| WO | 2015138859 A1 | 9/2015 |
| WO | 2021/063570 A1 | 4/2021 |

* cited by examiner

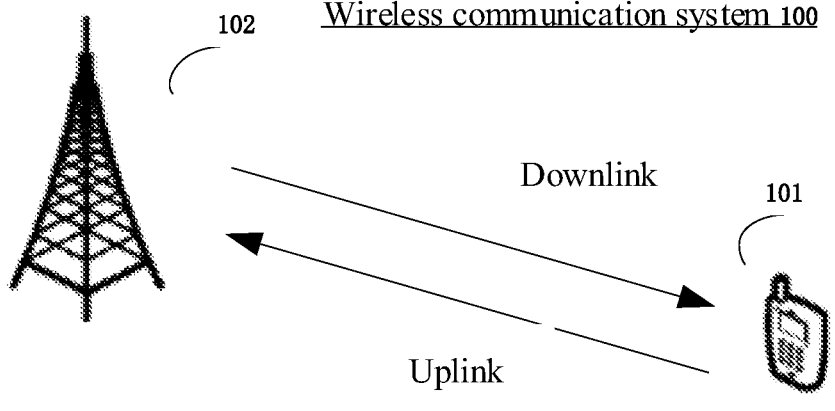

Wireless communication system 100

Downlink

Uplink

FIG. 1

| Network device | | UE |

S201: Send first indication information to the UE, the first indication information being used to indicate whether the UE is allowed to use a static attribute, where the static attribute indicates that a static criterion is satisfied, and the relaxation degree of a relaxation measurement scheme corresponding to the static criterion is greater than the relaxation degree of a relaxation measurement scheme corresponding to a low mobility criterion and is greater than the relaxation degree of relaxation measurement scheme corresponding to a non-cell edge criterion

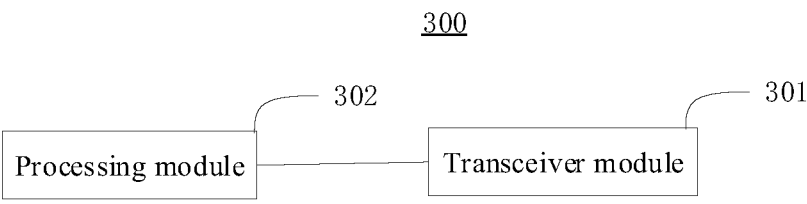

RELAXATION MEASUREMENT PROCESSING METHOD AND APPARATUS, AND READABLE STORAGE MEDIUM

CROSS REFERENCE TO RELATED APPLICATION

The present application is the U.S. National Stage Application of International Application No. PCT/CN2021/093840 filed on May 14, 2021, the entire content of which is incorporated herein by reference for all purposes.

BACKGROUND

In a mobile communication system, the movement of the position of a user equipment (UE) may lead to the constant change of the channel state around the UE. In order to support the mobility of the UE and obtain the channel state of the current cell of the UE in time, a network device may configure radio resource management (RRM) measurements for the UE, and the UE may perform cell selection or cell reselection autonomously in the idle state based on the results of RRM measurements.

SUMMARY

The present disclosure relates to the technical field of wireless communication, and in particular to a relaxation measurement processing method and apparatus, and a readable storage medium.

In a first aspect, an example of the present disclosure provides a relaxation measurement processing method, which is executed by a network device, including: sending first indication information to a user equipment, the first indication information being used to indicate whether the user equipment is allowed to use a static attribute. Where the static attribute indicates that a static criterion is satisfied, and relaxation degree of a relaxation measurement scheme corresponding to the static criterion is greater than relaxation degree of a relaxation measurement scheme corresponding to a low mobility criterion, and is greater than relaxation degree of a relaxation measurement scheme corresponding to a non-cell edge criterion.

In a second aspect, an example of the present disclosure provides a relaxation measurement processing method, which is executed by the user equipment, the method including: determining a first result according to static attribute information of the user equipment, where the static attribute information indicates whether the user equipment has a static attribute and the first result indicates whether the user equipment satisfies a static criterion; and performing relaxation measurement processing according to the first result.

In a third aspect, an example of the present disclosure provides a communication apparatus. The communication apparatus may be configured to execute the steps executed by the network device in the design of the first aspect. The network device can realize the functions in the included method in the form of hardware structures, software modules, or hardware structures and software modules.

When the communication apparatus shown in the third aspect is implemented by software modules, the communication apparatus may include a transceiver module and a processing module which are coupled to each other. The transceiver module may be configured to support the communication of the communication apparatus, and the processing module may be configured to perform processing operations by the communication apparatus, for example, generating information/messages to be sent, or obtaining information/messages by processing the received signal.

When executing the steps in the first aspect, the transceiver module is configured to send the first indication information to a user equipment, the first indication information being used to indicate whether the user equipment is allowed to use a static attribute. Where the static attribute indicates that a static criterion is satisfied, and relaxation degree of a relaxation measurement scheme corresponding to the static criterion is greater than relaxation degree of a relaxation measurement scheme corresponding to a low mobility criterion and is greater than relaxation degree of a relaxation measurement scheme corresponding to a non-cell edge criterion.

In a fourth aspect, an example of the present disclosure provides a communication apparatus. The communication apparatus may be configured to execute the steps executed by a user equipment in the design of the second aspect. The network device can realize the functions in the included method in the form of hardware structures, software modules, or hardware structures and software modules.

When the communication apparatus shown in the fourth aspect is implemented by software modules, the communication apparatus may include a transceiver module and a processing module which are coupled to each other, where the transceiver module may be configured to support the communication of the communication apparatus, and the processing module may be configured to perform processing operations by the communication apparatus, for example, generating information/messages to be sent, or obtaining information/messages by processing the received signal.

When executing the steps in the second aspect, the processing module is configured to: determine a first result according to static attribute information of the user equipment, where the static attribute information indicates whether the user equipment has a static attribute and the first result indicates whether the user equipment satisfies a static criterion; and, to perform relaxation measurement processing according to the first result.

In a fifth aspect, the present disclosure provides a communication system, which may include the communication apparatus shown in the third aspect and the communication apparatus shown in the fourth aspect. The communication apparatus shown in the third aspect may be composed of software modules and/or hardware components. The communication apparatus shown in the fourth aspect may be composed of software modules and/or hardware components.

In a sixth aspect, the present disclosure provides a communication apparatus, including a processor and a memory, where the memory is configured to store a computer program which, when executed by the processor, causes the processor to implement the design of the first aspect.

In a seventh aspect, the present disclosure provides a communication apparatus, including a processor and a memory, where the memory is configured to store a computer program which, when executed by the processor, causes the processor to implement the following steps: determine a first result according to static attribute information of the user equipment, wherein the static attribute information indicates whether the user equipment has a static attribute, and the first result indicates whether the user equipment satisfies a static criterion; and perform relaxation measurement processing according to the first result.

In an eighth aspect, the present disclosure provides a non-transitory computer-readable storage medium, having instructions (or referred to as computer programs or programs) stored thereon which, when called for execution on a computer, cause the computer to implement the design of the first aspect.

In a ninth aspect, the present disclosure provides a non-transitory computer-readable storage medium, having instructions (or referred to as computer programs or programs) stored thereon which, when called for execution on a computer, cause the computer to implement the design of the second aspect.

It is to be understood that the foregoing general description and the following detailed description are illustrative and explanatory and are not intended to limit the present disclosure.

BRIEF DESCRIPTION OF THE DRAWINGS

The above and/or additional aspects and benefits of the present disclosure will become apparent and easy to understand from the description of the examples, in which: FIG. 1 is an architecture diagram of a wireless communication system according to an example of the present disclosure.

FIG. 2 is a flowchart of a relaxation measurement processing method according to an example.

FIG. 3 is a structural diagram of a relaxation measurement processing apparatus according to an example.

DETAILED DESCRIPTION

Figure 4:
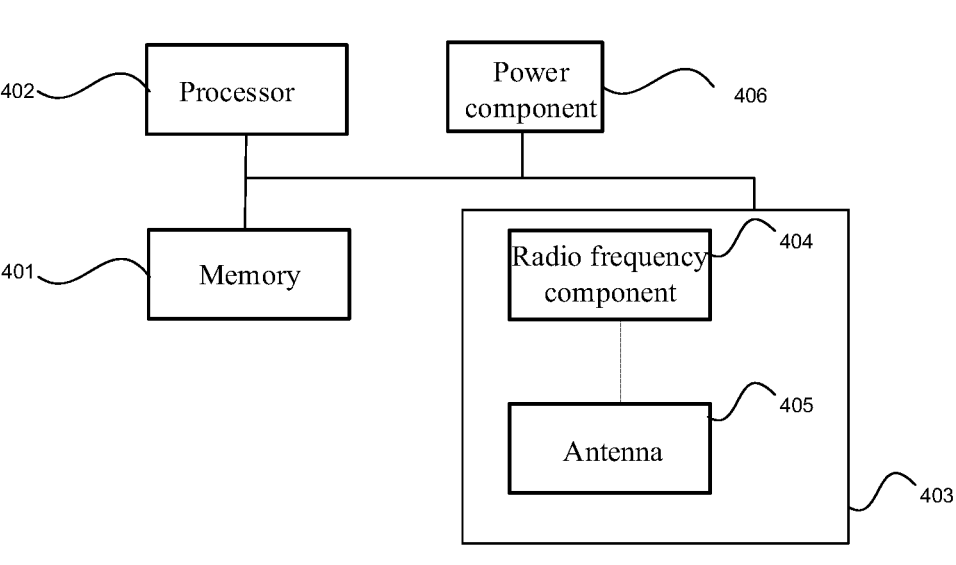
FIG. 4 is a structural diagram of another relaxation measurement processing apparatus according to an example.

A large number of radio resource management (RRM) measurements may increase the power consumption of the UE and affect the endurance. Thus, an RRM measurement relaxation criterion is introduced in New Radio (NR). In a situation where it is less possible for the UE to perform cell reselection (for example, the UE has low mobility or is not at an edge of the cell), the UE is allowed to perform measurement relaxation to a certain extent.

There are some devices that are in a static state most of the time, such as RedCap devices, or other devices with limited capabilities, such as industrial sensors, surveillance cameras, and so on. Such devices are in the static state most of the time, or the moving track of such devices are relatively determined, so the possibility of cell reselection for such devices is less than the possibility of cell reselection for enhanced mobile broadband (eMBB) devices. How to provide a more reasonable relaxation measurement scheme for such devices is a technical problem to be solved.

The examples of the present disclosure will be further described below by specific implementations with reference to the accompanying drawings.

Examples will be described in detail herein, and instances of which are shown in the accompanying drawings. When the accompanying drawings are involved in the following description, unless otherwise indicated, the same numbers in different accompanying drawings indicate the same or similar elements. The implementations described in the following examples do not represent all implementations consistent with the examples of the present disclosure. Instead, these examples are instances of apparatuses and methods consistent with some aspects of the present disclosure as detailed in the appended claims.

As shown in FIG. 1, the relaxation measurement processing method provided in the examples of the present disclosure may be applied to a wireless communication system 100. The wireless communication system 100 may include a user equipment 101 and a network device 102. The user equipment 101 is configured to support carrier aggregation, and the user equipment 101 may be connected to a plurality of carrier units of the network device 102, including a primary carrier unit and one or more secondary carrier units.

It is to be understood that the wireless communication system 100 may be applied to a low frequency scenario or a high frequency scenario. The application scenario of the wireless communication system 100 includes, but not limited to: long term evolution (LTE) system, LTE frequency division duplex (FDD) system, LTE time division duplex (TDD) system, worldwide interoperability for micro wave access (WiMAX) communication system, cloud radio access network (CRAN) system, future 5th-Generation (5G) system, new radio (NR) communication system or future evolved public land mobile network (PLMN) system, etc.

The above user equipment (UE) 101 may be a terminal, an access terminal, a terminal unit, a terminal station, a mobile station (MS), a remote station, a remote terminal, a mobile terminal, a wireless communication device, a terminal agent, a user device, etc. The UE 101 may have a wireless transmitting/receiving function, which can communicate (e.g., wirelessly communicate) with one or more network devices of one or more communication systems and accept network services provided by the network device. Here, the network device includes, but not limited to, the illustrated network device 102.

For example, the UE 101 may be a cellular phone, a cordless phone, a session initiation protocol (SIP) phone, a wireless local loop (WLL) station, a personal digital assistant (PDA) device, a handheld device with a wireless communication function, a computing device or other processing devices connected to a wireless modem, a vehicle-mounted device, a wearable device, a user device in the future 5G network, or a user device in the future evolved PLMN network, etc.

The network device 102 may be an access network device (or called an access network site). The access network device refers to a device that provides a network access function, for example, a radio access network (RAN) base station, etc. The network device 102 may specifically include a base station (base station, BS), or include a base station and wireless resource management equipment for controlling the base station, etc. The network device 102 may further include a relay station (relay device), an access point, and a base station in the future 5G network, a base station or an NR base station in the future evolved PLMN network, etc. The network device 102 may be a wearable device or a vehicle-mounted device. The network device 102 may also be a communication chip with a communication module.

For example, the network device 102 includes, but not limited to: a next generation node B (gNB) in 5G, an evolved node B (eNB) in the LTE system, a radio network controller (RNC), a node B (NB) in the WCDMA system, a radio controller in the CRAN system, a base station controller (BSC), a base transceiver station (BTS) in the GSM system or CDMA system, a home base station (e.g., home evolved node B, or home node B (HNB)), a baseband unit (BBU), a transmitting and receiving point (TRP), a transmitting point (TP), or a mobile switching center, etc.

An example of the present disclosure provides a relaxation measurement processing method. This method is executed by the network device. With reference to FIG. 2, FIG. 2 is a flowchart of a relaxation measurement processing method according to an example. As shown in FIG. 2, this method includes step S201.

In step S201, first indication information is sent to a UE, the first indication information being used to indicate whether the UE is allowed to use a static attribute. The static attribute indicates that a static criterion is satisfied, and the relaxation degree of a relaxation measurement scheme corresponding to the static criterion is greater than the relaxation degree of a relaxation measurement scheme corresponding to a low mobility criterion and is greater than the relaxation degree of a relaxation measurement scheme corresponding to a non-cell edge criterion.

In some possible implementations, with regard to the low mobility criterion, if the difference between the reference received signal strength and the current strength of the user is less than a preset threshold, the low mobility criterion is satisfied.

With regard to the non-cell edge criterion, if the current received signal power (Srxlev) of the UE is greater than a first threshold and the received signal quality (Squal) is greater than a second threshold, the non-cell edge criterion is satisfied.

The measurement relaxation criterion in the Release 16 (Rel-16) includes: if only the criterion of not being at the non-cell edge criterion is satisfied, the relaxation measurement scheme corresponding to the criterion is to extend the measurement period; if only the low mobility criterion is satisfied, the relaxation measurement scheme corresponding to the criterion is to extend the measurement period; and if both the low mobility criterion and the criterion of not being at the non-cell edge criterion are satisfied, the corresponding relaxation measurement scheme is to stop measurement for a first duration, where the first duration is at most 1 hour.

In some possible implementations, the static determination condition corresponding to the static criterion includes a first condition and a second condition.

In a first aspect, the difference between the reference RSRP signal strength and the current RSRP signal strength of the user is less than a preset RSRP signal strength.

In a second aspect, the serving beam within the preset duration does not change, or the number of changes of the serving beam is less than a preset beam value.

During determining according to the static determination condition whether the static criterion is satisfied, the static criterion is satisfied if the static determination condition is satisfied; and, the static criterion is not satisfied if the static determination condition is not satisfied.

For the low mobility criterion in the Rel-16 release, the condition regarding the serving beam is introduced in the static criterion, so that the condition of satisfying the static criterion is more stringent, and the low mobility state and the static state of the UE can be effectively distinguished.

In an example, the relaxation measurement scheme corresponding to the low mobility criterion is to extend the original measurement period by X timing units, and the relaxation measurement scheme corresponding to the static criterion is to extend the original measurement period by Y timing units, Y is greater than X, so that the relaxation degree of the relaxation measurement scheme corresponding to the static criterion is greater than the relaxation degree of the relaxation measurement scheme corresponding to the low mobility criterion.

In an example, the relaxation measurement scheme corresponding to the low mobility criterion is to stop measurement for total M timing units, and the relaxation measurement scheme corresponding to the static criterion is to stop measurement for total N timing units, where N is greater than M, so that the relaxation degree of the relaxation measurement scheme corresponding to the static criterion is greater than the relaxation degree of the relaxation measurement scheme corresponding to the low mobility criterion.

The concept that the relaxation degree of the relaxation measurement scheme corresponding to the static criterion is greater than the relaxation degree of the relaxation measurement scheme corresponding to the non-cell edge criterion is the same as the above.

In the example of the present disclosure, the concept of static attribute is proposed to be applicable to the UE which is in a static state most of the time or the moving track of which is relatively determined. In addition, the network device sends the first indication information to the UE, and the first indication information is used to indicate whether the UE is allowed to use the static attribute. When the UE has the static attribute, the UE can use the static attribute correspondingly according to the indication of the network device, and the network device uniformly controls the UE having the static attribute in different situations, so that the UE in different situations uses or does not use the static attribute, so as to achieve the effect of reasonably controlling the UE in different situations.

An example of the present disclosure provides a relaxation measurement processing method. This method is executed by the network device. This method includes broadcasting first indication information to the UE through a system message, the first indication information being used to indicate whether the UE is allowed to use the static attribute. The first indication information, including second indication information, the value of the second indication information corresponding to a first value, the first value indicating that the UE is allowed to use the static attribute.

The static attribute indicates that the static criterion is satisfied, and the relaxation degree of a relaxation measurement scheme corresponding to the static criterion is greater than the relaxation degree of a relaxation measurement scheme corresponding to the low mobility criterion and is greater than the relaxation degree of a relaxation measurement scheme corresponding to the non-cell edge criterion.

In a possible example, the network device broadcasts the first indication information to the UE through the system message, the first indication information includes the second indication information, and the value of the second indication information is 1. Here, 1 indicates that the UE is allowed to use the static attribute.

In a possible example, the first indication information is also called static attribute usability indication.

In the example of the present disclosure, the network device indicates, to the UE and through the system message, the first indication information and the second indication information, that the UE can use the static attribute.

An example of the present disclosure provides a relaxation measurement processing method. This method is executed by the network device. This method includes: broadcasting the first indication information to the UE through the system message, the first indication information including third indication information. The value of the third indication information corresponding to a second value and the second value indicating that the UE is not allowed to use the static attribute.

The static attribute indicates that the static criterion is satisfied, and the relaxation degree of a relaxation measurement scheme corresponding to the static criterion is greater than the relaxation degree of a relaxation measurement scheme corresponding to the low mobility criterion and is greater than the relaxation degree of a relaxation measurement scheme corresponding to the non-cell edge criterion.

In a possible example, the network device broadcasts the first indication information to the UE through the system message, the first indication information includes third indication information, and the value of the third indication information is 0. Here, 0 indicates that the UE is not allowed to use the static attribute.

In a possible example, the first indication information is also called static attribute usability indication.

In the example of the present disclosure, the network device indicates, to the UE and through the system message, the first indication information and the third indication information, that the UE cannot use the static attribute.

An example of the present disclosure provides a relaxation measurement processing method. This method is executed by the network device. This method includes: broadcasting the first indication information to the UE through the system message. The first indication information does not include second indication information and the value of the second indication information corresponds to a first value indicating that the UE is allowed to use the static attribute.

The static attribute indicates that the static criterion is satisfied, and the relaxation degree of a relaxation measurement scheme corresponding to the static criterion is greater than the relaxation degree of a relaxation measurement scheme corresponding to the low mobility criterion and is greater than the relaxation degree of a relaxation measurement scheme corresponding to the non-cell edge criterion.

In a possible example, the network device broadcasts the first indication information to the UE through the system message, the first indication information not including second indication information.

In a possible example, the first indication information is also called static attribute usability indication.

In the example of the present disclosure, the network device indicates, to the UE and through the system message and the first indication information, that the UE cannot use the static attribute.

An example of the present disclosure provides a relaxation measurement processing method. This method is executed by the network device. This method includes broadcasting the first indication information to the UE. The first indication information being used to indicate whether the UE is allowed to use the static attribute, the static attribute indicates that the static criterion is satisfied, and the relaxation degree of a relaxation measurement scheme corresponding to the static criterion is greater than the relaxation degree of a relaxation measurement scheme corresponding to the low mobility criterion and is greater than the relaxation degree of a relaxation measurement scheme corresponding to the non-cell edge criterion. The method further includes sending information for indicating a timing duration to the UE, the timing duration is a duration of the UE disabling the static attribute after connection of a radio control link is failed.

In the example of the present disclosure, the network device sends information for indicating the timing duration to the UE, so it is equivalent to configure a timer for the UE. Thus, in a situation where the network cannot know the real-time position of the UE in time after the connection of the radio control link is failed, the UE disables the static attribute of the UE in a period of time to avoid improper relaxation measurement processing.

An example of the present disclosure provides a relaxation measurement processing method. This method is executed by the network device. This method includes broadcasting the first indication information to the UE. The first indication information being used to indicate whether the UE is allowed to use the static attribute, the static attribute indicates that the static criterion is satisfied, and the relaxation degree of a relaxation measurement scheme corresponding to the static criterion is greater than the relaxation degree of a relaxation measurement scheme corresponding to the low mobility criterion and is greater than the relaxation degree of a relaxation measurement scheme corresponding to the non-cell edge criterion. The method further includes sending information for indicating a first measurement relaxation criterion to the UE, where the first measurement relaxation criterion includes the static criterion.

In the example of the present disclosure, the first measurement relaxation criterion is newly defined. The first measurement relaxation criterion includes the static criterion, and the first measurement relaxation criterion is applicable to the UE which is in a static state most of the time or the moving track of which is relatively determined.

An example of the present disclosure provides a relaxation measurement processing method. This method is executed by the network device. This method includes: broadcasting the first indication information to the UE. The first indication information being used to indicate whether the UE is allowed to use the static attribute, the static attribute indicates that the static criterion is satisfied, and the relaxation degree of a relaxation measurement scheme corresponding to the static criterion is greater than the relaxation degree of a relaxation measurement scheme corresponding to the low mobility criterion and is greater than the relaxation degree of a relaxation measurement scheme corresponding to the non-cell edge criterion. The method further includes sending information for indicating a first measurement relaxation criterion to the UE, where the first measurement relaxation criterion includes the static criterion.

The first measurement relaxation criterion includes the static criterion and at least one of the low mobility criterion or the non-cell edge criterion in the measurement relaxation criterion in Rel-16.

In a possible implementation, the first measurement relaxation criterion includes the static criterion and the low mobility criterion.

In a possible implementation, the first measurement relaxation criterion includes the static criterion and the non-cell edge criterion.

In a possible implementation, the first measurement relaxation criterion includes the static criterion, the low mobility criterion, and the non-cell edge criterion.

In the example of the present disclosure, the first measurement relaxation criterion is newly defined, and the first measurement relaxation criterion is the supplement to the measurement relaxation criterion in Rel-16. The first measurement relaxation criterion includes the static criterion and at least one criterion in the measurement relaxation criterion in Rel-16, so that the first measurement relaxation criterion is more comprehensive and reasonable.

An example of the present disclosure provides a relaxation measurement processing method. This method is executed by the network device. This method includes broadcasting the first indication information to the UE. The first indication information being used to indicate whether the UE is allowed to use the static attribute, the static attribute indicates that the static criterion is satisfied, and the relaxation degree of a relaxation measurement scheme corresponding to the static criterion is greater than the relaxation degree of a relaxation measurement scheme corresponding to the low mobility criterion and is greater than the relaxation degree of a relaxation measurement scheme corresponding to the non-cell edge criterion. The method further includes sending information for indicating a second measurement relaxation criterion and information for indicating the static criterion to the UE, the second measurement relaxation criterion includes at least one of the low mobility criterion or the non-cell edge criterion.

In the example of the present disclosure, the static criterion and the second measurement relaxation criterion are defined as the supplement to the measurement relaxation criterion in Rel-16, so that the relaxation criterion is more comprehensive and reasonable.

An example of the present disclosure provides a relaxation measurement processing method. This method is executed by the network device. This method includes: broadcasting the first indication information to the UE. The first indication information being used to indicate whether the UE is allowed to use the static attribute, the static attribute indicates that the static criterion is satisfied, and the relaxation degree of a relaxation measurement scheme corresponding to the static criterion is greater than the relaxation degree of a relaxation measurement scheme corresponding to the low mobility criterion and is greater than the relaxation degree of a relaxation measurement scheme corresponding to the non-cell edge criterion. The method further includes sending relaxation measurement parameter indication information to the UE, the relaxation measurement parameter indication information being used to indicate at least one of the static criterion, the low mobility criterion, or the non-cell edge criterion.

In a possible implementation, relaxation measurement parameter indication information is sent to the UE, the relaxation measurement parameter indication information being used to indicate a relaxation measurement parameter of the static criterion.

In a possible implementation, relaxation measurement parameter indication information is sent to the UE, the relaxation measurement parameter indication information being used to indicate a relaxation measurement parameter of the static criterion and a relaxation measurement parameter of the low mobility criterion.

In a possible implementation, relaxation measurement parameter indication information is sent to the UE, the relaxation measurement parameter indication information being used to indicate a relaxation measurement parameter of the static criterion and a relaxation measurement parameter of the non-cell edge criterion.

An example of the present disclosure provides a relaxation measurement processing method. This method is executed by the UE. The method includes: determining a first result according to static attribute information of the UE, where the static attribute information indicates whether the UE has a static attribute and the first result indicates whether the UE satisfies a static criterion; and performing relaxation measurement processing according to the first result.

In some possible implementations, when the device type of the UE is a set type, the UE has the static attribute.

In some possible implementations, the UE receives a control instruction through a human interaction interface, and is set to have or not have the static attribute according to the control instruction.

In the example of the present disclosure, the concept of static attribute is proposed to be applicable to the UE which is in a static state most of the time or the moving track of which is relatively determined. Thus, a reasonable relaxation measurement processing scheme is provided for the UE which is in the static state most of the time or the moving track of which is relatively determined.

An example of the present disclosure provides a relaxation measurement processing method. This method is executed by the UE. This method includes: receiving first indication information from the network device, the first indication information being used to indicate whether the UE is allowed to use the static attribute; determining the first result according to the static attribute information of the UE and the first indication information, where the static attribute information indicates whether the UE has the static attribute and the first result indicates whether the UE satisfies the static criterion; and performing relaxation measurement processing according to the first result.

In the example of the present disclosure, the UE receives the first indication information from the network device and determines, according to the first indication information, whether the static attribute can be used. As a result, the UE uses the static attribute correspondingly according to the indication of the network device, and the network device uniformly controls the UEs having the static attribute in different situations. Thus, the UEs in different situations use or do not use the static attribute according to the corresponding situations, and the effect of reasonably controlling the UEs in different situations is achieved.

An example of the present disclosure provides a relaxation measurement processing method. This method is executed by the UE. This method includes: receiving the first indication information broadcasted by the network device through the system message, the first indication information including second indication information, the value of the second indication information corresponding to a first value, the first value indicating that the UE is allowed to use the static attribute; determining the first result according to the static attribute information of the UE and the first indication information, where the static attribute information indicates whether the UE has the static attribute and the first result indicates whether the UE satisfies the static criterion; and performing relaxation measurement processing according to the first result.

In the example of the present disclosure, the first indication information broadcasted by the network device through the system message is received, and it is determined, according to the value of the second indication information in the first indication information, that the UE is allowed to use the static attribute.

An example of the present disclosure provides a relaxation measurement processing method. This method is executed by the UE. This method includes: receiving the first indication information broadcasted by the network device through the system message, the first indication information including third indication information, the value of the third indication information corresponding to a second value, the second value indicating that the UE is not allowed to use the static attribute; determining the first result according to the static attribute information of the UE and the first indication information, where the static attribute information indicates whether the UE has the static attribute and the first result indicates whether the UE satisfies the static criterion; and performing relaxation measurement processing according to the first result.

In the example of the present disclosure, the first indication information broadcasted by the network device through the system message is received, and it is determined, according to the value of the third indication information in the first indication information, that the UE is not allowed to use the static attribute.

An example of the present disclosure provides a relaxation measurement processing method. This method is executed by a UE. This method includes: receiving the first indication information broadcasted by the network device through the system message, where the first indication information does not include second indication information, and the value of the second indication information corresponds to a first value indicating that the UE is allowed to use the static attribute; determining the first result according to the static attribute information of the UE and the first indication information, where the static attribute information indicates whether the UE has the static attribute and the first result indicates whether the UE satisfies the static criterion; and performing relaxation measurement processing according to the first result.

In the example of the present disclosure, the first indication information broadcasted by the network device through the system message is received, and it is determined, according to the value of the second indication information not included in the first indication information, that the UE is not allowed to use the static attribute.

An example of the present disclosure provides a relaxation measurement processing method. This method is executed by the UE. This method includes: receiving the first indication information from the network device, the first indication information being used to indicate whether the UE is allowed to use the static attribute; disabling the static attribute, where signal received quality of a serving cell where the UE is located does not satisfy a cell selection criterion; determining the first result according to the static attribute information of the UE and the first indication information, where the static attribute information indicates whether the UE has the static attribute and the first result indicates whether the UE satisfies the static criterion; and performing relaxation measurement processing according to the first result.

In the example of the present disclosure, when the signal received quality of the serving cell where the UE is located does not satisfy the cell selection criterion, it is considered that the network connection state of the UE is not satisfactory, so that it is possible that the network cannot know the real-time position of the UE in time, and the static attribute of the UE is disabled to avoid improper relaxation measurement processing.

An example of the present disclosure provides a relaxation measurement processing method. This method is executed by the UE. This method includes: receiving the first indication information from the network device, the first indication information being used to indicate whether the UE is allowed to use the static attribute; when the signal received quality of the serving cell where the UE is located does not satisfy the cell selection criterion, disabling the static attribute; determining the first result according to the static attribute information of the UE and the first indication information, where the static attribute information indicates whether the UE has the static attribute and the first result indicates whether the UE satisfies the static criterion; and performing relaxation measurement processing according to the first result.

In the example of the present disclosure, when the signal received quality of the serving cell where the UE is located does not satisfy the cell selection criterion, it is considered that the network connection state of the UE is not satisfactory, so that it is possible that the network cannot know the real-time position of the UE in time, and the static attribute of the UE is disabled to avoid improper relaxation measurement processing.

An example of the present disclosure provides a relaxation measurement processing method. This method is executed by the UE. This method includes: receiving the first indication information from the network device, the first indication information being used to indicate whether the UE is allowed to use the static attribute; receiving information for indicating a timing duration from the network device, the timing duration corresponding to a duration of the UE disabling the static attribute after connection of a radio control link is failed; and disabling the static attribute according to the timing duration after the connection of the radio control link is failed; determining the first result according to the static attribute information of the UE and the first indication information, where the static attribute information indicates whether the UE has the static attribute and the first result indicates whether the UE satisfies the static criterion; and performing relaxation measurement processing according to the first result.

In the example of the present disclosure, the UE receives the information for indicating the timing duration from the network device, so it is equivalent that the network device configures a timer for the UE. Thus, in a situation where the network cannot known the real-time position of the UE in time after the connection of the radio control link is failed, the UE disables the static attribute of the UE for a period of time to avoid improper relaxation measurement processing.

An example of the present disclosure provides a relaxation measurement processing method. This method is executed by the UE. This method includes: receiving the first indication information from the network device, the first indication information being used to indicate whether the UE is allowed to use the static attribute; the first indication information is information for indicating that the UE is allowed to use the static attribute and the static attribute information indicates that the UE has the static attribute, determining the first result to be that the UE satisfies the static criterion; and performing relaxation measurement processing according to the first result.

In the example of the present disclosure, when the network device indicates that the UE can use the static attribute and the UE has the static attribute, the UE determines that the static criterion is satisfied.

An example of the present disclosure provides a relaxation measurement processing method. This method is executed by the UE. This method includes: receiving the first indication information from the network device, the first indication information being used to indicate whether the UE is allowed to use the static attribute; when the first indication information is information for indicating that the UE is not allowed to use the static attribute, determining the first result according to the static determination condition corresponding to the static criterion, the first result indicating whether the UE satisfies the static criterion; and performing relaxation measurement processing according to the first result.

In some possible examples, determining the first result according to the static determination condition corresponding to the static criterion includes: when the static determination condition is satisfied, determining the first result to be that the UE satisfies the static criterion; and, when the static determination condition is not satisfied, determining the first result to be that the UE does not satisfy the static criterion.

In the example of the present disclosure, when the network device indicates that the UE cannot use the static attribute, the UE determines according to the static determination condition whether the static criterion is satisfied.

An example of the present disclosure provides a relaxation measurement processing method. This method is executed by the UE. This method includes: receiving the first indication information from the network device, the first indication information being used to indicate whether the UE is allowed to use the static attribute; when the static attribute information indicates that the UE does not have the static attribute, determining the first result according to the static determination condition corresponding to the static criterion, the first result indicating whether the UE satisfies the static criterion; and performing relaxation measurement processing according to the first result.

In some possible examples, determining the first result according to the static determination condition corresponding to the static criterion includes: when the static determination condition is satisfied, determining the first result to be that the UE satisfies the static criterion; and, when the static determination condition is not satisfied, determining the first result to be that the UE does not satisfy the static criterion.

In the example of the present disclosure, when the UE does not have the static attribute, the UE determines according to the static determination condition whether the static criterion is satisfied.

An example of the present disclosure provides a relaxation measurement processing method. This method is executed by the UE. This method includes: receiving the first indication information from the network device, the first indication information being used to indicate whether the UE is allowed to use the static attribute; receiving information for indicating a first measurement relaxation criterion from the network device, where the first measurement relaxation criterion includes the static criterion and further includes at least one of the low mobility criterion or the non-cell edge criterion; the first indication information is information for indicating that the UE is allowed to use the static attribute and the static attribute information indicates that the UE has the static attribute, determining that the UE satisfies the static criterion; and when the first indication information is information for indicating that the UE is allowed to use the static attribute, the static attribute information indicates that the UE has the static attribute, and the first measurement relaxation criterion includes the static criterion but not the low mobility criterion and the non-cell edge criterion, executing a relaxation measurement scheme corresponding to a first state, where the first state is a state where only the static criterion is satisfied.

According to the first indication information being information for indicating that the UE is allowed to use the static attribute and the static attribute information indicating that the UE has the static attribute, it is determined that the static criterion is satisfied.

In the example of the present disclosure, when the network device indicates that the UE can use the static attribute, the UE has the static attribute and the first measurement relaxation criterion includes only the static criterion, it is determined that the static criterion is satisfied, and the relaxation measurement scheme corresponding to the first state is executed.

An example of the present disclosure provides a relaxation measurement processing method. This method is executed by the UE. This method includes: receiving the first indication information from the network device, the first indication information being used to indicate whether the UE is allowed to use the static attribute; receiving information for indicating the first measurement relaxation criterion from the network device, where the first measurement relaxation criterion includes the static criterion and further includes at least one of the low mobility criterion or the non-cell edge criterion; and when the first indication information is information for indicating that the UE is allowed to use the static attribute, the static attribute information indicates that the UE has the static attribute, and the first measurement relaxation criterion includes the static criterion and the non-cell edge criterion but not the low mobility criterion, and when it is determined that the non-cell edge criterion is satisfied according to a non-cell edge determination condition corresponding to the non-cell edge criterion, executing a relaxation measurement scheme corresponding to a second state, where the second state is a state where both the static criterion and the non-cell edge criterion are satisfied.

According to the first indication information being information for indicating that the UE is allowed to use the static attribute and the static attribute information indicating that the UE has the static attribute, it is determined that the static criterion is satisfied.

In the example of the present disclosure, when the network device indicates that the UE can use the static attribute, the UE has the static attribute and the first measurement relaxation criterion includes the static criterion and the non-cell edge criterion, it is determined that the static criterion is satisfied; and, when it is determined, according to the non-cell edge determination condition corresponding to the non-cell edge criterion, that the non-cell edge criterion is satisfied, the relaxation measurement scheme corresponding to the second state is executed.

An example of the present disclosure provides a relaxation measurement processing method. This method is executed by the UE. This method includes: receiving first indication information from the network device, the first indication information being used to indicate whether the UE is allowed to use the static attribute; receiving information for indicating a first measurement relaxation criterion from the network device, where the first measurement relaxation criterion includes the static criterion and further includes at least one of the low mobility criterion or the non-cell edge criterion; and when the first indication information is information for indicating that the UE is allowed to use the static attribute, the static attribute information indicates that the UE has the static attribute, and the first measurement relaxation criterion includes the static criterion and the non-cell edge criterion but not the low mobility criterion, and when it is determined that the non-cell edge criterion is not satisfied according to a non-cell edge determination condition corresponding to the non-cell edge criterion, executing a relaxation measurement scheme corresponding to a first state, where the first state is a state where only the static criterion is satisfied.

In the example of the present disclosure, when the network device indicates that the UE can use the static attribute, the UE has the static attribute and the first measurement relaxation criterion includes the static criterion and the non-cell edge criterion, it is determined that the static criterion is satisfied; and, when it is determined, according to the non-cell edge determination condition corresponding to the non-cell edge criterion, that the non-cell edge criterion is not satisfied, the relaxation measurement scheme corresponding to the first state is executed.

An example of the present disclosure provides a relaxation measurement processing method. This method is executed by the UE. This method includes: receiving the first indication information from the network device, the first indication information being used to indicate whether the UE is allowed to use the static attribute; receiving information for indicating a second measurement relaxation criterion and information for indicating the static criterion from the network device, where the second measurement relaxation criterion includes at least one of the low mobility criterion or the non-cell edge criterion; and when the first indication information is information for indicating that the UE is allowed to use the static attribute and the static attribute information indicates that the UE has the static attribute, executing a relaxation measurement scheme corresponding to a first state, where the first state is a state where only the static criterion is satisfied.

An example of the present disclosure provides a relaxation measurement processing method. This method is executed by the UE. This method includes: receiving the first indication information from the network device, the first indication information being used to indicate whether the UE is allowed to use the static attribute; receiving information for indicating the second measurement relaxation criterion and information for indicating the static criterion from the network device, where the second measurement relaxation criterion includes at least one of the low mobility criterion or the non-cell edge criterion; and when the first indication information is information for indicating that the UE is not allowed to use the static attribute, or the static attribute information indicates that the UE does not have the static attribute, and when it is determined that the static criterion is satisfied according to a static determination condition corresponding to the static criterion, executing a relaxation measurement scheme corresponding to a first state; and, when it is determined that the static criterion is not satisfied according to the static determination condition corresponding to the static criterion and that the second measurement relaxation criterion is satisfied, executing a relaxation measurement scheme corresponding to a third state, a fourth state or a fifth state; where the third state corresponds to a state where only the low mobility criterion is satisfied, the fourth state corresponds to a state where only the non-cell edge criterion is satisfied, and the fifth state corresponds to a state where both the low mobility criterion and the non-cell edge criterion are satisfied.

An example of the present disclosure provides a relaxation measurement processing method. This method is executed by the UE. This method includes: receiving the first indication information from the network device, the first indication information being used to indicate whether the UE is allowed to use the static attribute; and receiving information for indicating the first measurement relaxation criterion from the network device, where the first measurement relaxation criterion includes the static criterion and further includes at least one of the low mobility criterion or the non-cell edge criterion; and when the first indication information is information for indicating that the UE is allowed to use the static attribute and the UE is in an idle state or an inactive state.

The method further includes at least one of: receiving parameter indication information from the network device, the parameter indication information indicating relaxation measurement parameter of the low mobility criterion but not the relaxation measurement parameter of the static criterion and the non-cell edge criterion, and executing, when it is determined that the low mobility criterion is satisfied according to a low mobility determination condition corresponding to the low mobility criterion, a relaxation measurement scheme corresponding to a third state, where the third state is a state where only the low mobility criterion is satisfied; receiving parameter indication information from the network device, the parameter indication information indicating the relaxation measurement parameter of the non-cell edge criterion but not the relaxation measurement parameter of the static criterion and the low mobility criterion, and executing, when it is determined that the non-cell edge criterion is satisfied according to a non-cell edge determination condition corresponding to the non-cell edge criterion, a relaxation measurement scheme corresponding to a fourth state, where the fourth state is a state where only the non-cell edge criterion is satisfied; or receiving parameter indication information from the network device, the parameter indication information indicating the relaxation measurement parameter of the low mobility criterion and the relaxation measurement parameter of the non-cell edge criterion but not the relaxation measurement parameter of the static criterion, determining whether a second measurement relaxation criterion is satisfied, and executing, when the second measurement relaxation criterion is satisfied, a relaxation measurement scheme corresponding to the third state, the fourth state or a fifth state; where the third state corresponds to a state where only the low mobility criterion is satisfied, the fourth state corresponds to a state where only the non-cell edge criterion is satisfied, and the fifth state corresponds to a state where both the low mobility criterion and the non-cell edge criterion are satisfied.

An example of the present disclosure provides a relaxation measurement processing method. This method is executed by the UE. This method includes: receiving the first indication information from the network device, the first indication information being used to indicate whether the UE is allowed to use the static attribute; and receiving information for indicating a first measurement relaxation criterion from the network device, where the first measurement relaxation criterion includes the static criterion and further includes at least one of the low mobility criterion or the non-cell edge criterion; and when the first indication information is information for indicating that the UE is allowed to use the static attribute and the UE is in an idle state or an inactive state.

The method further includes: receiving parameter indication information from the network device; and when the parameter indication information indicates relaxation measurement parameter of the static criterion but not the relaxation measurement parameter of the non-cell edge criterion and the relaxation measurement parameter of the low mobility criterion, or when the parameter indication information indicates the relaxation measurement parameter of the static criterion and the relaxation measurement parameter of the low mobility criterion but not the relaxation measurement parameter of the non-cell edge criterion, determining that the static criterion is satisfied, and executing a relaxation measurement scheme corresponding to a first state, where the first state is a state where only the static criterion is satisfied.

An example of the present disclosure provides a relaxation measurement processing method. This method is executed by the UE. This method includes: receiving the first indication information from the network device, the first indication information being used to indicate whether the UE is allowed to use the static attribute; and receiving information for indicating a first measurement relaxation criterion from the network device, where the first measurement relaxation criterion includes the static criterion and further includes at least one of the low mobility criterion or the non-cell edge criterion; and when the first indication information is information for indicating that the UE is allowed to use the static attribute and the UE is in an idle state or an inactive state.

The method further includes one of: receiving parameter indication information from the network device, the parameter indication information indicating relaxation measurement parameter of the static criterion, the relaxation measurement parameter of the non-cell edge criterion and the relaxation measurement parameter of the low mobility criterion or the parameter indication information indicating the relaxation measurement parameter of the static criterion and the relaxation measurement parameter of the non-cell edge criterion but not the relaxation measurement parameter of the low mobility criterion, determining, when the UE does not satisfy the non-cell edge criterion, that the static criterion is satisfied, and executing a relaxation measurement scheme corresponding to a first state, where the first state is a state where only the static criterion is satisfied; or receiving parameter indication information from the network device, the parameter indication information indicating the relaxation measurement parameter of the static criterion, the relaxation measurement parameter of the non-cell edge criterion and the relaxation measurement parameter of the low mobility criterion or the parameter indication information indicating the relaxation measurement parameter of the static criterion and the relaxation measurement parameter of the non-cell edge criterion but not the relaxation measurement parameter of the low mobility criterion, executing, when the UE satisfies the non-cell edge criterion, a relaxation measurement scheme corresponding to a second state, where the second state is a state where both the static criterion and the non-cell edge criterion are satisfied.

An example of the present disclosure provides a relaxation measurement processing method. This method is executed by the UE. This method includes: receiving the first indication information from the network device, the first indication information being used to indicate whether the UE is allowed to use the static attribute; and receiving information for indicating a second measurement relaxation criterion and information for indicating the static criterion from the network device, where the second measurement relaxation criterion includes at least one of the low mobility criterion or the non-cell edge criterion; and when the first indication information is information for indicating that the UE is allowed to use the static attribute and the UE is in an idle state or an inactive state.

The method further includes: receiving parameter indication information from the network device, the parameter indication information indicating relaxation measurement parameter of the static criterion, determining that the static criterion is satisfied, and executing a relaxation measurement scheme corresponding to a first state, where the first state is a state where only the static criterion is satisfied.

An example of the present disclosure provides a relaxation measurement processing method. This method is executed by the UE. This method includes: receiving the first indication information from the network device, the first indication information being used to indicate whether the UE is allowed to use the static attribute; receiving information for indicating a second measurement relaxation criterion and information for indicating the static criterion from the network device, where the second measurement relaxation criterion includes at least one of the low mobility criterion or the non-cell edge criterion; receiving parameter indication information from the network device, the parameter indication information indicating relaxation measurement parameter of the static criterion; and when the first indication information is information for indicating that the UE is not allowed to use the static attribute or when the UE does not have the static attribute, determining that the static criterion is satisfied according to a static determination condition corresponding to the static criterion, and executing a relaxation measurement scheme corresponding to a first state; where the first state is a state where only the static criterion is satisfied.

An example of the present disclosure provides a relaxation measurement processing method. This method is executed by the UE. This method includes: receiving the first indication information from the network device, the first indication information being used to indicate whether the UE is allowed to use the static attribute; receiving information for indicating a second measurement relaxation criterion and information for indicating the static criterion from the network device, where the second measurement relaxation criterion includes at least one of the low mobility criterion or the non-cell edge criterion; receiving parameter indication information from the network device, the parameter indication information indicating relaxation measurement parameter of the static criterion; and when the first indication information is information for indicating that the UE is not allowed to use the static attribute, or when the UE does not have the static attribute, determining that the static criterion is not satisfied according to a static determination condition corresponding to the static criterion, determining whether the second measurement relaxation criterion is satisfied, and executing, when the second measurement relaxation criterion is satisfied, a relaxation measurement scheme corresponding to a third state. Where the third state is one of: a state where only the low mobility criterion is satisfied; a state where only the non-cell edge criterion is satisfied; or a state where both the low mobility criterion and the non-cell edge criterion are satisfied.

Based on the same idea as the included method examples, an example of the present disclosure further provides a communication apparatus. The communication apparatus may have the functions of the network device 102 in the included method examples, and may be configured to execute the steps executed by the network device 102 provided in the included method examples. The functions may be implemented by hardware, or may be implemented by software or hardware to execute corresponding software. The hardware or software includes one or more modules corresponding to the functions.

In a possible implementation, the communication apparatus 300 shown in FIG. 3 may be used as the network device involved in the included method examples, and executes the steps executed by the network device in the included method examples. As shown in FIG. 3, the communication apparatus 300 may include a transceiver module 301 and a processing module 302. The transceiver module 301 and the processing module 302 are coupled to each other. The transceiver module 301 may be configured to support the communication of the communication apparatus 300, and the transceiver module 301 may have a wireless communication function. For example, the transceiver module 301 can perform wireless communication with other communication apparatuses through a wireless air interface. The processing module 302 may be configured to support the communication apparatus 300 to perform processing actions in the included method examples, including but not limited to: generating information or messages sent by the transceiver module 301, and/or demodulating and decoding the signal received by the transceiver module 301, etc.

When executing the steps executed by the network device 102, the transceiver module 301 is configured to send the first indication information to the UE, the first information being used to indicate whether the UE is allowed to use the static attribute. Where the static attribute indicates that the static criterion is satisfied, and the relaxation degree of a relaxation measurement scheme corresponding to the static criterion is greater than the relaxation degree of a relaxation measurement scheme corresponding to the low mobility criterion, and is greater than the relaxation degree of a relaxation measurement scheme corresponding to the non-cell edge criterion.

Alternatively, the transceiver module 301 is further configured to send the first indication information to the UE by the following method: broadcasting the first indication information to the UE through a system message, the first indication information including second indication information, the value of the second indication information corresponding to a first value, the first value indicating that the UE is allowed to use the static attribute.

Alternatively, the transceiver module 301 is further configured to send the first indication information to the UE by the following method: broadcasting the first indication information to the UE through a system message, the first indication information including third indication information, the value of the third indication information corresponding to a second value, the second value indicating that the UE is not allowed to use the static attribute; or broadcasting the first indication information to the UE through a system message, where the first indication information does not include second indication information, and the value of the second indication information corresponds to a first value, and the first value indicates that the UE is allowed to use the static attribute.

Alternatively, the transceiver module 301 is further configured to send information for indicating a timing duration to the UE, the timing duration being a duration of the UE disabling the static attribute after connection of a radio control link is failed.

Alternatively, the transceiver module 301 is further configured to send information for indicating a first measurement relaxation criterion to the UE. Where the first measurement relaxation criterion includes the static criterion.

Alternatively, the first measurement relaxation criterion further includes at least one of the low mobility criterion or the non-cell edge criterion.

Alternatively, the transceiver module 301 is further configured to send information for indicating a second measurement relaxation criterion and information for indicating the static criterion to the UE. Where the second measurement relaxation criterion includes at least one of the low mobility criterion or the non-cell edge criterion.

Alternatively, the transceiver module 301 is further configured to send relaxation measurement parameter indication information to the UE, the relaxation measurement parameter indication information being used to indicate at least one of the static criterion, the low mobility criterion, or the non-cell edge criterion.

When the communication apparatus is the network device 102, the structure may also be as shown in FIG. 4. The structure of the communication apparatus will be described by taking a base station as an example. As shown in FIG. 4, the communication apparatus 400 includes a memory 401, a processor 402, a transceiver component 403 and a power component 406. The memory 401 is coupled to the processor 402, and may be configured to store programs and data necessary for the communication apparatus 400 to realize various functions. The processor 402 is configured to support the communication apparatus 400 to execute the corresponding functions in the included methods, and the functions may be realized by calling the programs stored in the memory 401.

The transceiver component 403 may be a wireless transceiver, which may be configured to support the communication apparatus 400 to receive signaling and/or data and send signaling and/or data through a wireless air interface. The transceiver component 403 may also be called a transceiver unit or a communication unit, and the transceiver component 403 may include a radio frequency component 404 and one or more antennas 405. The radio frequency component 404 may be a remote radio unit (RRU) and may be specifically configured for the transmission of radio frequency signals and the conversion between radio frequency signals and baseband signals, and the one or more antennas 405 may be specifically configured for the radiation and reception of radio frequency signals.

The power component 406 provides power to various components of the communication apparatus 400. The power component 406 may include a power management system, one or more power sources, and any other components associated with the generation, management, and distribution of power of the communication apparatus 400.

When the communication apparatus 400 needs to send data, the processor 402 may perform baseband processing on the data to be sent and then output a baseband signal to the radio frequency unit, and the radio frequency unit performs radio frequency processing on the baseband signal and then sends a radio frequency signal in the form of electromagnetic waves through the antenna. When the data is sent to the communication apparatus 400, the radio frequency unit receives the radio frequency signal through the antenna, then converts the radio frequency signal into a baseband signal and outputs the baseband signal to the processor 402, and the processor 402 converts the baseband signal into data and then processes the data.

Based on the included method examples, an example of the present disclosure further provides a communication apparatus. The communication apparatus may have the functions of the UE 101 in the methods included above, and may be configured to execute the steps executed by the UE 101 provided in the included method examples. The functions may be implemented by hardware, or may be implemented by software or hardware to execute corresponding software. The hardware or software includes one or more modules corresponding to the above functions.

Figure 5:
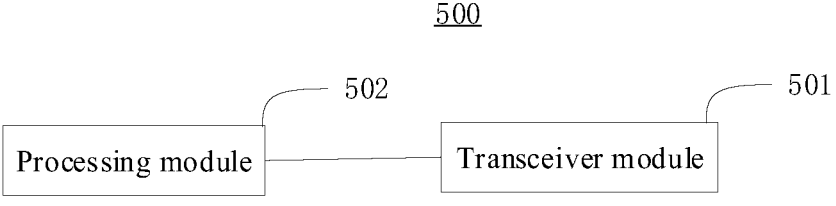
FIG. 5 is a structural diagram of another relaxation measurement processing apparatus according to an example.

In a possible implementation, the communication apparatus 500 shown in FIG. 5 may be used as the UE involved in the included method examples, and executes the steps executed by the UE in the included method examples. As shown in FIG. 5, the communication apparatus 500 may include a transceiver module 501 and a processing module 502. The transceiver module 501 and the processing module 502 are coupled to each other. The transceiver module 501 may be configured to support the communication of the communication apparatus 500, and the transceiver module 501 may have a wireless communication function. For example, the transceiver module 501 can perform wireless communication with other communication apparatuses through a wireless air interface. The processing module 502 may be configured to support the communication apparatus 500 to perform processing actions in the included method examples, including but not limited to: generating information or messages sent by the transceiver module 501, and/or demodulating and decoding the signal received by the transceiver module 501, etc.

When executing the steps executed by the UE 101, the processing module 502 is configured to: determine a first result according to static attribute information of the UE, where the static attribute information indicates whether the UE has a static attribute, and the first result indicates whether the UE satisfies a static criterion; and, to perform relaxation measurement processing according to the first result.

Alternatively, the transceiver module 501 is configured to receive first indication information from the network device, the first indication information being used to indicate whether the UE is allowed to use the static attribute.

The processing module 502 is further configured to determine the first result according to the static attribute information of the UE by the following method: determining the first result according to the static attribute information of the UE and the first indication information.

Alternatively, the transceiver module 501 is further configured to receive the first indication information from the network device by the following method: receiving the first indication information broadcasted by the network device through a system message, the first indication information including second indication information, the value of the second indication information corresponding to a first value, the first value indicating that the UE is allowed to use the static attribute.

Alternatively, the transceiver module 501 is further configured to receive the first indication information from the network device by the following method: receiving the first indication information broadcasted by the network device through a system message, the first indication information including third indication information, the value of the third indication information corresponding to a second value, the second value indicating that the UE is not allowed to use the static attribute, or receiving the first indication information broadcasted by the network device through a system message, where the first indication information does not include second indication information, and the value of the second indication information corresponds to a first value, and the first value indicates that the UE is allowed to use the static attribute.

Alternatively, the processing module 502 is further configured to disable the static attribute, where signal received quality of a serving cell where the UE is located does not satisfy a cell selection criterion.

Alternatively, the transceiver module 501 is further configured to receive information for indicating a timing duration from the network device, the timing duration corresponding to a duration of the UE disabling the static attribute after connection of a radio control link is failed.

The processing module 502 is further configured to disable the static attribute according to the timing duration after the connection of the radio control link is failed.

Alternatively, the processing module 502 is further configured to determine the first result according to the first indication information and the static attribute information by the following method: the first indication information is information for indicating that the UE is allowed to use the static attribute, and the static attribute information indicates that the UE has the static attribute, determining the first result to be that the UE satisfies the static criterion.

Alternatively, the processing module 502 is further configured to determine the first result according to the first indication information and the static attribute information by the following method: when the first indication information is information for indicating that the UE is not allowed to use the static attribute, or when the static attribute information indicates that the UE does not have the static attribute, determining the first result according to the static determination condition corresponding to the static criterion, the first result indicating whether the UE satisfies the static criterion.

Alternatively, the transceiver module 501 is further configured to receive information for indicating a first measurement relaxation criterion from the network device, where the first measurement relaxation criterion includes the static criterion and further includes at least one of a low mobility criterion or a non-cell edge criterion.

The processing module 502 is further configured to: when the first indication information is information for indicating that the UE is allowed to use the static attribute, the static attribute information indicates that the UE has the static attribute and the first measurement relaxation criterion includes the static criterion but not the low mobility criterion and the non-cell edge criterion, execute a relaxation measurement scheme corresponding to a first state, where the first state is a state where only the static criterion is satisfied.

Alternatively, the transceiver module 501 is further configured to receive information for indicating a first measurement relaxation criterion from the network device, where the first measurement relaxation criterion includes the static criterion and further includes at least one of a low mobility criterion or a non-cell edge criterion.

The processing module 502 is further configured to: when the first indication information being information for indicating that the UE is allowed to use the static attribute, the static attribute information indicates that the UE has the static attribute, and the first measurement relaxation criterion includes the static criterion and the non-cell edge criterion but not the low mobility criterion, and when it is determined that the non-cell edge criterion is satisfied according to a non-cell edge determination condition corresponding to the non-cell edge criterion, execute a relaxation measurement scheme corresponding to a second state, where the second state is a state where both the static criterion and the non-cell edge criterion are satisfied.

Alternatively, the transceiver module 501 is further configured to receive information for indicating a first measurement relaxation criterion from the network device, where the first measurement relaxation criterion includes the static criterion and further includes at least one of a low mobility criterion or a non-cell edge criterion.

The processing module 502 is further configured to: when the first indication information is information for indicating that the UE is allowed to use the static attribute, the static attribute information indicates that the UE has the static attribute, and the first measurement relaxation criterion includes the static criterion and the non-cell edge criterion but not the low mobility criterion, and when it is determined that the non-cell edge criterion is not satisfied according to a non-cell edge determination condition corresponding to the non-cell edge criterion, execute a relaxation measurement scheme corresponding to a first state, where the first state is a state where only the static criterion is satisfied.

Alternatively, the transceiver module 501 is further configured to receive information for indicating a second measurement relaxation criterion and information for indicating the static criterion from the network device, where the second measurement relaxation criterion includes at least one of a low mobility criterion or a non-cell edge criterion.

The processing module 502 is further configured to: when the first indication information is information for indicating that the UE is allowed to use the static attribute, and the static attribute information indicates that the UE has the static attribute, execute a relaxation measurement scheme corresponding to a first state, where the first state is a state where only the static criterion is satisfied.

Alternatively, the transceiver module 501 is further configured to receive information for indicating a second measurement relaxation criterion and information for indicating the static criterion from the network device, where the second measurement relaxation criterion includes at least one of a low mobility criterion or a non-cell edge criterion.

The processing module 502 is further configured to: when the first indication information is information for indicating that the UE is not allowed to use the static attribute, or the static attribute information indicates that the UE does not have the static attribute, and when it is determined that the static criterion is satisfied according to a static determination condition corresponding to the static criterion, execute a relaxation measurement scheme corresponding to a first state; and when it is determined that the static criterion is not satisfied according to the static determination condition corresponding to the static criterion and that the second measurement relaxation criterion is satisfied, execute a relaxation measurement scheme corresponding to a third state, a fourth state or a fifth state. Where the third state corresponds to a state where only the low mobility criterion is satisfied, the fourth state corresponds to a state where only the non-cell edge criterion is satisfied, and the fifth state corresponds to a state where both the low mobility criterion and the non-cell edge criterion are satisfied.

Alternatively, the transceiver module 501 is further configured to receive information for indicating a first measurement relaxation criterion from the network device, where the first measurement relaxation criterion includes the static criterion and further includes at least one of a low mobility criterion or a non-cell edge criterion.

The transceiver module 501 is further configured to receive parameter indication information from the network device, the parameter indication information indicating the relaxation measurement parameter of the low mobility criterion, but not the relaxation measurement parameter of the static criterion and the non-cell edge criterion.

The processing module 502 is further configured to: when the first indication information is information for indicating that the UE is allowed to use the static attribute and the UE is in an idle state or inactive state, and when it is determined that the low mobility criterion is satisfied according to the low mobility determination condition corresponding to the low mobility criterion, execute a relaxation measurement scheme corresponding to a third state, where the third state is a state where only the low mobility criterion is satisfied.

Alternatively, the transceiver module 501 is further configured to receive information for indicating a first measurement relaxation criterion from the network device, where the first measurement relaxation criterion includes the static criterion and further includes at least one of a low mobility criterion or a non-cell edge criterion.

The transceiver module 501 is further configured to receive parameter indication information from the network device, the parameter indication information indicating the relaxation measurement parameter of the non-cell edge criterion, but not the relaxation measurement parameter of the static criterion and the low mobility criterion.

The processing module 502 is further configured to: when the first indication information is information for indicating that the UE is allowed to use the static attribute and the UE is in an idle state or inactive state, and when it is determined that the non-cell edge criterion is satisfied according to the non-cell edge determination condition corresponding to the non-cell edge criterion, execute a relaxation measurement scheme corresponding to a fourth state, where the fourth state is a state where only the non-cell edge criterion is satisfied.

Alternatively, the transceiver module 501 is further configured to receive information for indicating a first measurement relaxation criterion from the network device, where the first measurement relaxation criterion includes the static criterion and further includes at least one of a low mobility criterion or a non-cell edge criterion.

The transceiver module 501 is further configured to receive parameter indication information from the network device, the parameter indication information indicating the relaxation measurement parameter of the low mobility criterion and the relaxation measurement parameter of the non-cell edge criterion, but not the relaxation measurement parameter of the static criterion.

The processing module 502 is further configured to: when the first indication information is information for indicating that the UE is allowed to use the static attribute and the UE is in an idle state or inactive state, determine whether the second measurement relaxation criterion is satisfied, and execute, when the second measurement relaxation criterion is satisfied, a relaxation measurement scheme corresponding to a third state, a fourth state or a fifth state. Where the third state corresponds to a state where only the low mobility criterion is satisfied, the fourth state corresponds to a state where only the non-cell edge criterion is satisfied, and the fifth state corresponds to a state where both the low mobility criterion and the non-cell edge criterion are satisfied.

Alternatively, the transceiver module 501 is further configured to receive information for indicating a first measurement relaxation criterion from the network device, where the first measurement relaxation criterion includes the static criterion and further includes at least one of a low mobility criterion or a non-cell edge criterion; and the transceiver module 501 is further configured to receive parameter indication information from the network device.

The processing module 502 is further configured to: when the first indication information is information for indicating that the UE is allowed to use the static attribute and the UE is in an idle state or inactive state, and when the parameter indication information indicates the relaxation measurement parameter of the static criterion but not the relaxation measurement parameter of the non-cell edge criterion and the relaxation measurement parameter of the low mobility criterion, or when the parameter indication information indicates the relaxation measurement parameter of the static criterion and the relaxation measurement parameter of the low mobility criterion but not the relaxation measurement parameter of the non-cell edge criterion, determine that the static criterion is satisfied, and execute a relaxation measurement scheme corresponding to a first state, where the first state is a state where only the static criterion is satisfied.

Alternatively, the transceiver module 501 is further configured to receive information for indicating a first measurement relaxation criterion from the network device, where the first measurement relaxation criterion includes the static criterion and further includes at least one of a low mobility criterion or a non-cell edge criterion; and the transceiver module 501 is further configured to receive parameter indication information from the network device, the parameter indication information indicating the relaxation measurement parameter of the static criterion, the relaxation measurement parameter of the non-cell edge criterion and the relaxation measurement parameter of the low mobility criterion, or the parameter indication information indicating the relaxation measurement parameter of the static criterion and the relaxation measurement parameter of the non-cell edge criterion but not the relaxation measurement parameter of the low mobility criterion.

The processing module 502 is further configured to: when the first indication information is information for indicating that the UE is allowed to use the static attribute and the UE is in an idle state or inactive state, and when it is determined that the UE does not satisfy the non-cell edge criterion, determine that the static criterion is satisfied, and execute a relaxation measurement scheme corresponding to a first state, where the first state is a state where only the static criterion is satisfied.

Alternatively, the transceiver module 501 is further configured to receive information for indicating a first measurement relaxation criterion from the network device. Where the first measurement relaxation criterion includes the static criterion and further includes at least one of a low mobility criterion or a non-cell edge criterion. The transceiver module 501 is further configured to receive parameter indication information from the network device. The parameter indication information indicating the relaxation measurement parameter of the static criterion, the relaxation measurement parameter of the non-cell edge criterion and the relaxation measurement parameter of the low mobility criterion, or the parameter indication information indicating the relaxation measurement parameter of the static criterion and the relaxation measurement parameter of the non-cell edge criterion but not the relaxation measurement parameter of the low mobility criterion.

The processing module 502 is further configured to: when the first indication information is information for indicating that the UE is allowed to use the static attribute, and the UE is in an idle state or inactive state. When it is determined that the UE satisfies the non-cell edge criterion, execute a relaxation measurement scheme corresponding to a second state, where the second state is a state where both the static criterion and the non-cell edge criterion are satisfied.

Alternatively, the transceiver module 501 is further configured to receive information for indicating a second measurement relaxation criterion and information for indicating the static criterion from the network device, where the second measurement relaxation criterion includes at least one of a low mobility criterion or a non-cell edge criterion. The transceiver module 501 is further configured to receive parameter indication information from the network device, the parameter indication information indicating the relaxation measurement parameter of the static criterion.

The processing module 502 is further configured to: when the first indication information is information for indicating that the UE is allowed to use the static attribute and the UE is in an idle state or inactive state, determine that the static criterion is satisfied, and execute a relaxation measurement scheme corresponding to a first state, where the first state is a state where only the static criterion is satisfied.

Alternatively, the transceiver module 501 is further configured to receive information for indicating a second measurement relaxation criterion and information for indicating the static criterion from the network device, where the second measurement relaxation criterion includes at least one of a low mobility criterion or a non-cell edge criterion. The transceiver module 501 is further configured to receive parameter indication information from the network device, the parameter indication information indicating the relaxation measurement parameter of the static criterion.

The processing module 502 is further configured to: when the first indication information is information for indicating that the UE is not allowed to use the static attribute, determine that the static criterion is satisfied according to the static determination condition corresponding to the static criterion, and execute a relaxation measurement scheme corresponding to a first state.

Alternatively, the transceiver module 501 is further configured to receive information for indicating a second measurement relaxation criterion and information for indicating the static criterion from the network device, where the second measurement relaxation criterion includes at least one of a low mobility criterion or a non-cell edge criterion. The transceiver module 501 is further configured to receive parameter indication information from the network device, the parameter indication information indicating the relaxation measurement parameter of the static criterion.

The processing module 502 is further configured to: when the UE does not have the static attribute, determine that the static criterion is satisfied according to the static determination condition corresponding to the static criterion, and execute a relaxation measurement scheme corresponding to a first state.

Alternatively, the transceiver module 501 is further configured to: receive information for indicating a second measurement relaxation criterion and information for indicating the static criterion from the network device, where the second measurement relaxation criterion includes at least one of a low mobility criterion or a non-cell edge criterion. The transceiver module 501 is further configured to receive parameter indication information from the network device, the parameter indication information indicating the relaxation measurement parameter of the static criterion.

The processing module 502 is further configured to: when the first indication information is information for indicating that the UE is not allowed to use the static attribute or when the UE does not have the static attribute, determine that the static criterion is not satisfied according to the static determination condition corresponding to the static criterion, determine whether the second measurement relaxation criterion is satisfied, and execute, when the second measurement relaxation criterion is satisfied, a relaxation measurement scheme corresponding to a third state. Where the third state is one of: a state where only the low mobility criterion is satisfied; a state where only the non-cell edge criterion is satisfied; or a state where both the low mobility criterion and the non-cell edge criterion are satisfied.

Figure 6:
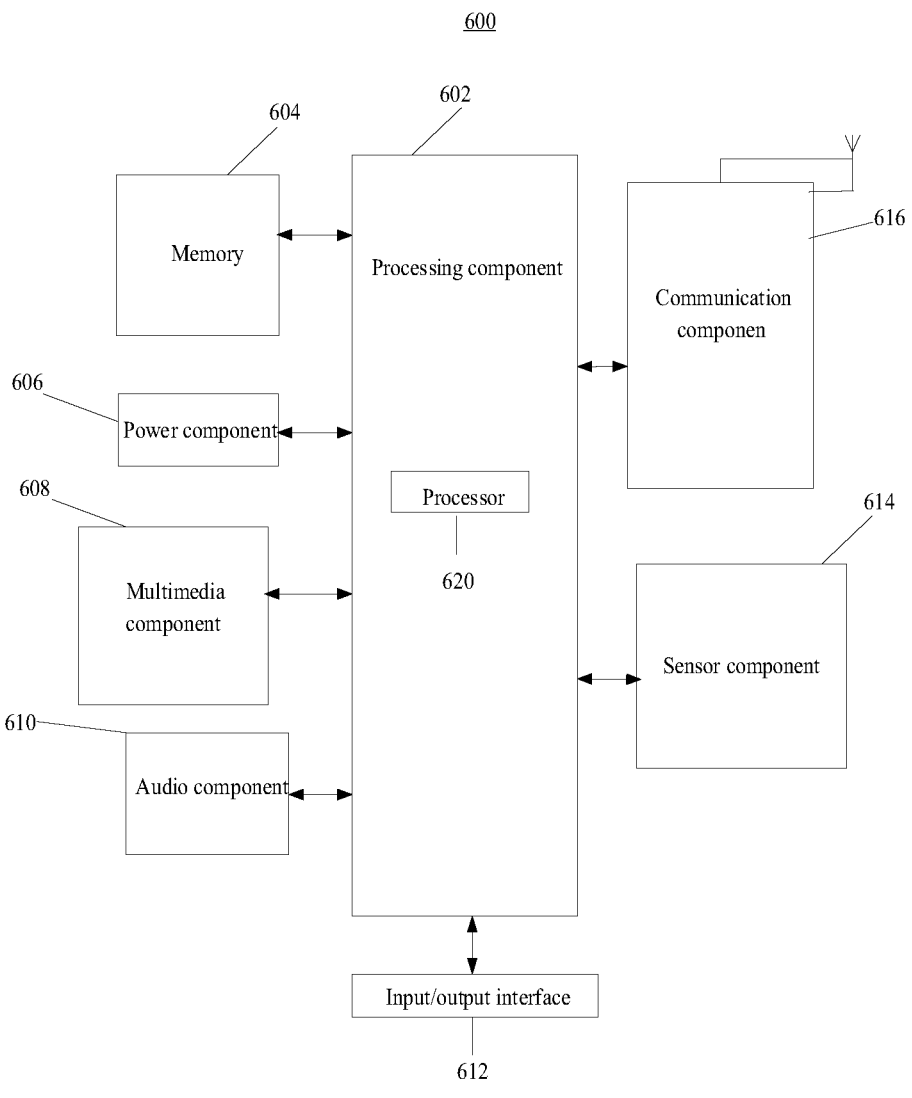
FIG. 6 is a structural diagram of another relaxation measurement processing apparatus according to an example.

When the communication apparatus is the UE 101, the structure may also be as shown in FIG. 6. For example, the apparatus 600 may be a mobile phone, a computer, a digital broadcasting terminal, a message transceiver device, a game console, a tablet device, a medical device, a fitness device, a personal digital assistant, etc.

With reference to FIG. 6, the apparatus 600 may include one or more of the following components: a processing component 602, a memory 604, a power component 606, a multimedia component 608, an audio component 610, an input/output (I/O) interface 612, a sensor component 614 and a communication component 616.

The processing component 602 generally controls the overall operation of the apparatus 600, such as operations associated with display, telephone call, data communication, camera operations and recording operations. The processing component 602 may include one or more processors 620 to execute instructions to complete all or some of the steps in the methods described above. In addition, the processing component 602 may include one or more modules to facilitate interaction between the processing component 602 and other components. For example, the processing component 602 may include a multimedia module to facilitate interaction between the multimedia component 608 and the processing component 602.

The memory 604 is configured to store various types of data to support the operation of the apparatus 600. Examples of the data include instructions for any application or method operating on the apparatus 600, contact data, phonebook data, messages, pictures, video or the like. The memory 604 may be implemented by any type of volatile or non-volatile storage devices or a combination of them, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 606 supplies power to various components of the apparatus 600. The power component 606 may include a power management system, one or more power supplies, and other components associated with the generation, management and distribution of power for the apparatus 600.

The multimedia component 608 includes a screen to provide an output interface between the apparatus 600 and a user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touch, slide and gestures on the touch panel. The touch sensor may sense the boundary of a touch or slide action, and detect the duration and pressure related to the touch or slide operation. In some examples, the multimedia component 608 includes a front camera and/or a rear camera. When the apparatus 600 is in an operating mode such as a shooting mode or a video mode, the front camera and/or the rear camera may receive external multimedia data. Each of the front camera and the rear camera may be a fixed optical lens system or have a focal length and an optical zooming capability.

The audio component 610 is configured to output and/or input audio signals. For example, the audio component 610 includes a microphone (MIC). When the apparatus 600 is in an operating mode such as a call mode, a recording mode or a voice recognition mode, the microphone is configured to receive external audio signals. The received audio signals may be further stored in the memory 604 or transmitted via the communication component 616. In some examples, the audio component 610 further includes a loudspeaker configured to output the audio signals.

The I/O interface 612 provides an interface between the processing component 602 and a peripheral interface module. The peripheral interface module may be a keyboard, a click wheel, buttons, etc. These buttons may include, but not limited to, a home button, a volume button, a start button and a lock button.

The sensor component 614 includes one or more sensors configured to provide state evaluation of various aspects of the apparatus 600. For example, the sensor component 614 may detect the on/off state of the apparatus 600 and the relative position of a component. For example, if the component is a display and a keypad of the apparatus 600, the sensor component 614 may also detect the position change of the apparatus 600 or one component of the apparatus 600, the presence or absence of the user's contact with the apparatus 600, the orientation or acceleration/deceleration of the apparatus 600 and the temperature change of the apparatus 600. The sensor component 614 may include a proximity sensor configured to detect the presence of nearby objects without any physical contact. The sensor component 614 may further include an optical sensor, e.g., a CMOS or CCD image sensor, for use in imaging applications. In some examples, the sensor component 614 may further include an acceleration sensor, a gyroscope sensor, a magnetic sensor, a pressure sensor or a temperature sensor.

The communication component 616 is configured to facilitate the wired or wireless communication between the apparatus 600 and other devices. The apparatus 600 may access to a wireless network based on communication standards, for example, WiFi, 2G, 3G or a combination of them. In an example, the communication component 616 receives a broadcast signal or broadcast related information from an external broadcast management system via a broadcast channel. In an example, the communication component 616 further includes a near-field communication (NFC) module to facilitate short-range communication. For example, the NFC module may be implemented based on a radio frequency identification (RFID) technology, an infrared data association (IrDA) technology, an ultra wide band (UWB) technology, a Bluetooth (BT) technology and other technologies.

In an example, the apparatus 600 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic elements to execute the methods described above.

In an example, a non-temporary computer-readable storage medium including instructions is further provided, for example, the memory 604 including instruments. The instruments may be executed by the processor 620 of the apparatus 600 to complete the methods described above. For example, the non-temporary computer-readable storage medium may be an ROM, a random access memory (RAM), a CD-ROM, a magnetic tape, a floppy disk, an optical data storage device, etc.

INDUSTRIAL APPLICABILITY

The concept of static attribute is proposed to be applicable to the UE which is in a static state most of the time or the moving track of which is relatively determined. In addition, the network device sends the first indication information to the UE, and the first indication information is used to indicate whether the UE is allowed to use the static attribute. When the UE has the static attribute, the UE can use the static attribute correspondingly according to the indication of the network device, and the network device uniformly controls the UE having the static attribute in different situations, so that the UE in different situations uses or does not use the static attribute, so as to achieve the effect of reasonably controlling the UE in different situations.

The invention claimed is:

1. A relaxation measurement processing method, which is executed by a network device, comprising:

sending first indication information to user equipment, the first indication information being used to indicate whether the user equipment is allowed to use a static attribute, wherein the static attribute indicates that a static criterion is satisfied, and relaxation degree of a relaxation measurement scheme corresponding to the static criterion is greater than relaxation degree of a relaxation measurement scheme corresponding to a low mobility criterion and is greater than relaxation degree of a relaxation measurement scheme corresponding to a non-cell edge criterion:

wherein a static determination condition corresponding to the static criterion comprises:

a difference between a reference Reference Signal Receiving Power (RSRP) signal strength and a current RSRP signal strength being less than a preset RSRP signal strength; and a serving beam within a preset duration not changing or a number of changes of the serving beam being less than a preset beam value.

2. The method of claim 1, further comprising:

sending information for indicating a timing duration to the user equipment, the timing duration being a duration of the user equipment disabling the static attribute after connection of a radio control link is failed.

3. The method of claim 1, further comprising:

sending information for indicating a first measurement relaxation criterion to the user equipment;

wherein the first measurement relaxation criterion comprises the static criterion.

4. The method of claim 1, further comprising:

sending information for indicating a second measurement relaxation criterion and information for indicating the static criterion to the user equipment wherein the second measurement relaxation criterion comprises at least one of the low mobility criterion or the non-cell edge criterion.

5. The method of claim 1, further comprising:

sending relaxation measurement parameter indication information to the user equipment, the relaxation measurement parameter indication information being used to indicate at least one of:

the static criterion;

the low mobility criterion; or the non-cell edge criterion.

6. A communication apparatus, comprising a processor and a memory, wherein:

the memory is configured to store a computer program; and the processor is configured to execute the computer program to perform the method of claim 1.

7. A non-transitory computer-readable storage medium, having instructions stored thereon which, when called for execution on a computer, cause the computer to perform the method of claim 1.

8. A relaxation measurement processing method, which is executed by user equipment, comprising:

determining a first result according to static attribute information of the user equipment, wherein the static attribute information indicates whether the user equipment has a static attribute, and the first result indicates whether the user equipment satisfies a static criterion; and performing relaxation measurement processing according to the first result;

wherein the static attribute indicates that the static criterion is satisfied, and relaxation degree of a relaxation measurement scheme corresponding to the static criterion is greater than relaxation degree of a relaxation measurement scheme corresponding to a low mobility criterion and is greater than relaxation degree of a relaxation measurement scheme corresponding to a non-cell edge criterion:

wherein a static determination condition corresponding to the static criterion comprises: a difference between a reference Reference Signal Receiving Power (RSRP) signal strength and a current RSRP signal strength being less than a preset RSRP signal strength; and a serving beam within a preset duration not changing or a number of changes of the serving beam being less than a preset beam value.

9. The method of claim 8, further comprising:

receiving first indication information from a network device, the first indication information being used to indicate whether the user equipment is allowed to use the static attribute;

wherein determining the first result according to the static attribute information of the user equipment comprises:

determining the first result according to the static attribute information of the user equipment and the first indication information.

10. The method of claim 9, further comprising:

disabling the static attribute, wherein signal received quality of a serving cell where the user equipment is located does not satisfy a cell selection criterion.

11. The method of claim 9, further comprising:

receiving information for indicating a timing duration from the network device, the timing duration corresponding to a duration of the user equipment disabling the static attribute after connection of a radio control link is failed; and disabling the static attribute according to the timing duration after the connection of the radio control link is failed.

12. The method of claim 9, further comprising:

receiving information for indicating a first measurement relaxation criterion from the network device, wherein the first measurement relaxation criterion comprises the static criterion and further comprises at least one of the low mobility criterion or the non-cell edge criterion; and on a condition that the first indication information is information for indicating that the user equipment is allowed to use the static attribute, the static attribute information indicates that the user equipment has the static attribute, and the first measurement relaxation criterion comprises the static criterion but does not comprise the low mobility criterion and the non-cell edge criterion, executing a relaxation measurement scheme corresponding to a first state;

wherein the first state is a state where only the static criterion is satisfied.

13. The method of claim 9, further comprising:

receiving information for indicating a first measurement relaxation criterion from the network device, wherein the first measurement relaxation criterion comprises the static criterion and further comprises at least one of the low mobility criterion or the non-cell edge criterion; and on a condition that the first indication information is information for indicating that the user equipment is allowed to use the static attribute, the static attribute information indicates that the user equipment has the static attribute, the first measurement relaxation criterion comprises the static criterion and the non-cell edge criterion but does not comprise the low mobility criterion, and it is determined that the non-cell edge criterion is satisfied according to a non-cell edge determination condition corresponding to the non-cell edge criterion, executing a relaxation measurement scheme corresponding to a second state;

wherein the second state is a state where both the static criterion and the non-cell edge criterion are satisfied.

14. The method of claim 9, further comprising:

receiving information for indicating a first measurement relaxation criterion from the network device, wherein the first measurement relaxation criterion comprises the static criterion and further comprises at least one of the low mobility criterion or the non-cell edge criterion; and on a condition that the first indication information is information for indicating that the user equipment is allowed to use the static attribute, the static attribute information indicates that the user equipment has the static attribute, the first measurement relaxation criterion comprises the static criterion and the non-cell edge criterion but does not comprise the low mobility criterion, and it is determined that the non-cell edge criterion is not satisfied according to a non-cell edge determination condition corresponding to the non-cell edge criterion, executing a relaxation measurement scheme corresponding to a first state, wherein the first state is a state where only the static criterion is satisfied.

15. The method of claim 9, further comprising:

receiving information for indicating a second measurement relaxation criterion and information for indicating the static criterion from the network device, wherein the second measurement relaxation criterion comprises at least one of the low mobility criterion or the non-cell edge criterion; and on a condition that the first indication information is information for indicating that the user equipment is allowed to use the static attribute, and the static attribute information indicates that the user equipment has the static attribute, executing a relaxation measurement scheme corresponding to a first state, wherein the first state is a state where only the static criterion is satisfied.

16. The method of claim 9, further comprising:

receiving information for indicating a second measurement relaxation criterion and information for indicating the static criterion from the network device, wherein the second measurement relaxation criterion comprises at least one of the low mobility criterion or the non-cell edge criterion; and on a condition that the first indication information is information for indicating that the user equipment is not allowed to use the static attribute or the static attribute information indicates that the user equipment does not have the static attribute, and in a case of determining that the static criterion is satisfied according to the static determination condition corresponding to the static criterion, executing a relaxation measurement scheme corresponding to a first state; and on a condition that it is determined that the static criterion is not satisfied according to the static determination condition corresponding to the static criterion and determining that the second measurement relaxation criterion is satisfied, executing a relaxation measurement scheme corresponding to a third state, a fourth state or a fifth state;

wherein the third state corresponds to a state where only the low mobility criterion is satisfied, the fourth state corresponds to a state where only the non-cell edge criterion is satisfied, and the fifth state corresponds to a state where both the low mobility criterion and the non-cell edge criterion are satisfied.

17. The method of claim 9, further comprising:

receiving information for indicating a first measurement relaxation criterion from the network device, wherein the first measurement relaxation criterion comprises the static criterion and further comprises at least one of the low mobility criterion or the non-cell edge criterion; and wherein on a condition that the first indication information is information for indicating that the user equipment is allowed to use the static attribute, and the user equipment is in an idle state or an inactive state, the method further comprises at least one of:

receiving parameter indication information from the network device, the parameter indication information indicating relaxation measurement parameter of the low mobility criterion but not indicating relaxation measurement parameter of the static criterion and the non-cell edge criterion, and executing, on a condition that it is determined that the low mobility criterion is satisfied according to a low mobility determination condition corresponding to the low mobility criterion, a relaxation measurement scheme corresponding to a third state, wherein the third state is a state where only the low mobility criterion is satisfied;

receiving the parameter indication information from the network device, the parameter indication information indicating the relaxation measurement parameter of the non-cell edge criterion but not indicating the relaxation measurement parameter of the static criterion and the low mobility criterion, and executing, on a condition that it is determined that the non-cell edge criterion is satisfied according to a non-cell edge determination condition corresponding to the non-cell edge criterion, a relaxation measurement scheme corresponding to a fourth state, wherein the fourth state is a state where only the non-cell edge criterion is satisfied; or receiving the parameter indication information from the network device, the parameter indication information indicating the relaxation measurement parameter of the low mobility criterion and the relaxation measurement parameter of the non-cell edge criterion but not indicating the relaxation measurement parameter of the static criterion, determining whether a second measurement relaxation criterion is satisfied, and executing, on a condition that the second measurement relaxation criterion is satisfied, a relaxation measurement scheme corresponding to the third state, the fourth state or a fifth state;

wherein the third state corresponds to a state where only the low mobility criterion is satisfied, the fourth state corresponds to a state where only the non-cell edge criterion is satisfied, and the fifth state corresponds to a state where both the low mobility criterion and the non-cell edge criterion are satisfied.

18. The method of claim 9, further comprising:

receiving information for indicating a second measurement relaxation criterion and information for indicating the static criterion from the network device, wherein the second measurement relaxation criterion comprises at least one of the low mobility criterion or the non-cell edge criterion;

wherein on a condition that the first indication information is information for indicating that the user equipment is allowed to use the static attribute and the user equipment is in an idle state or an inactive state, the method further comprises:

receiving parameter indication information from the network device, the parameter indication information indicating relaxation measurement parameter of the static criterion, determining that the static criterion is satisfied, and executing a relaxation measurement scheme corresponding to a first state, wherein the first state is a state where only the static criterion is satisfied.

19. A non-transitory computer-readable storage medium, having instructions stored thereon which, when called for execution on a computer, cause the computer to perform the method of claim 8.

20. A communication apparatus, comprising a processor and a memory, wherein:

the memory is configured to store a computer program; and the processor is configured to execute the computer program to implement the following steps:

determining a first result according to static attribute information of user equipment, wherein the static attribute information indicates whether the user equipment has a static attribute, and the first result indicates whether the user equipment satisfies a static criterion; and performing relaxation measurement processing according to the first result;

wherein the static attribute indicates that the static criterion is satisfied, and relaxation degree of a relaxation measurement scheme corresponding to the static criterion is greater than relaxation degree of a relaxation measurement scheme corresponding to a low mobility criterion and is greater than relaxation degree of a relaxation measurement scheme corresponding to a non-cell edge criterion;

wherein a static determination condition corresponding to the static criterion comprises: a difference between a reference Reference Signal Receiving Power (RSRP) signal strength and a current RSRP signal strength being less than a preset RSRP signal strength; and a serving beam within a preset duration not changing or a number of changes of the serving beam being less than a preset beam value.

* * * * *